United States Patent [19]
Cole

[11] 3,867,183

[45] Feb. 18, 1975

[54] METHOD OF COATING CHANNELED ENERGY-CONDUCTING PLATES

[75] Inventor: Henry B. Cole, East Woodstock, Conn.

[73] Assignee: American Optical Company, Southbridge, Mass.

[22] Filed: Apr. 8, 1966

[21] Appl. No.: 541,940

[52] U.S. Cl............ 117/107.2 R, 117/227, 118/49.5
[51] Int. Cl............................................. C23c 11/02
[58] Field of Search...................... 117/227, 107.2 R

[56] References Cited
UNITED STATES PATENTS

| 3,075,494 | 1/1963 | Toulmin, Jr. | 117/107.2 |
|---|---|---|---|
| 3,158,499 | 11/1964 | Jenkin | 117/107.2 |
| 3,178,308 | 4/1965 | Oxley et al. | 117/107.2 |
| 3,251,712 | 5/1966 | Berger | 117/227 |

FOREIGN PATENTS OR APPLICATIONS

| 837,797 | 6/1960 | Great Britain | 117/107.2 |

Primary Examiner—Leland A. Sebastian
Attorney, Agent, or Firm—William C. Nealon; Howard R. Berkenstock, Jr.

[57] ABSTRACT

The invention relates to an improvement in a method of gas plating the walls of channels of a multichanneled election amplifying element by thermal decomposition of a metal plating vapor continually directed through said channels which comprises the steps of preheating said plating vapor to nearly its decomposition temperature prior to entrance thereof into said channels of said elements and intermittently heating said element to a temperature at least equal to that of the decomposition temperature of said plating vapor and allowing said element to cool to a temperature below said decomposition temperature during said intervals between said intermittent heating to effect flushing of said residue gases of said vapor in said channels by said continuous flow thereof during said intervals.

2 Claims, 4 Drawing Figures

PATENTED FEB 18 1975
3,867,183
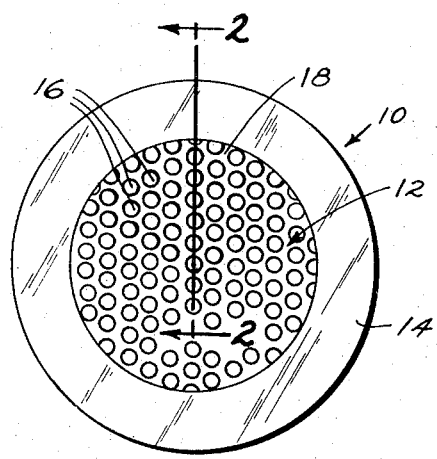
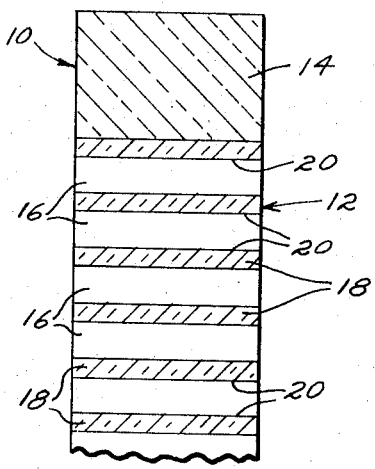
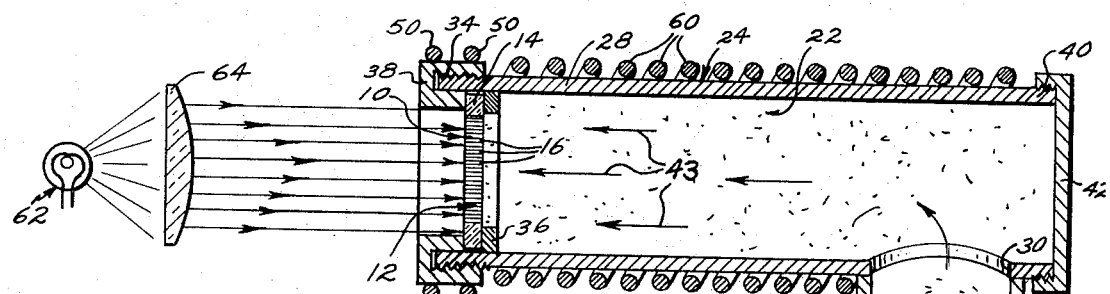
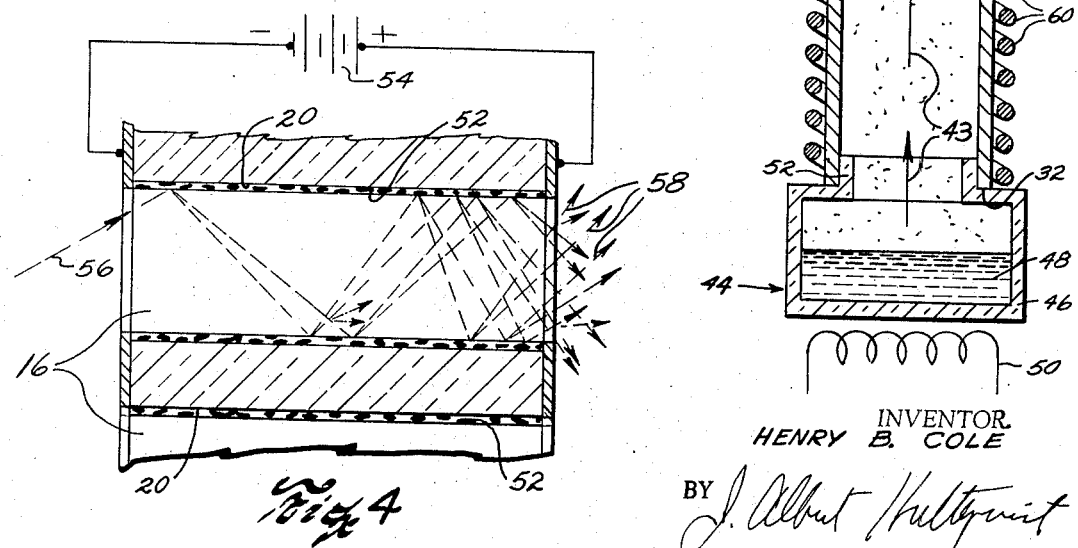
INVENTOR.
HENRY B. COLE
BY J. Albert Hultquist
ATTORNEY

METHOD OF COATING CHANNELED ENERGY-CONDUCTING PLATES

This invention relates to plates formed of glass or equivalent dielectric materials having a multiplicity of juxtaposed energy-conducting channels extending therethrough and has particular reference to a novel method of producing electrically conductive coatings along the walls of the channels in such plates.

Channel plates have utility as electron amplifiers when interposed between a cathode, either heated, cold or photo emissive, and an anode surface in an electron discharge device. In such an arrangement a uniform potential gradient from a relatively high voltage supply is produced along the lengths of the channels and electrons emitted from the cathode are caused to stream into the channels and strike the walls thereof. Thus, the incident electrons produce, by secondary emission, an amplified stream when it reaches the anode surface. The output of such an amplifier accordingly comprises electrons which originate almost entirely from the walls of the channels as secondary electrons and the electrons lost from the channel plate surface through secondary emission must be continually replenished for the plate to operate normally.

In order to prevent electron depletion in such a channel plate during its operation, electrical conductors must be provided in the channels which are sufficiently conductive to replenish the electrons lost through secondary emission yet of a low enough conductivity to prevent excessive heating thereof.

According to principles of the present invention such electrical conductors are provided along the channel walls in the form of thin metallic coatings.

While most metals are secondary emissive, a dielectric or less conductive material such as the base glass itself of the channel plate normally has greater secondary emissive properties when bombarded with electrons. contemplates in order to utilize the valued electron emissive properties of the glass as much as possible, the present invention contemplates providing the coatings in the form of an interconnected latticing or network of metallic deposits through which a substantial portion of the glass is exposed along the channel walls. Accordingly, electrons caused to enter and stream through the channels will, upon striking the glass and the metal coatings, free secondary electrons from both to produce electron amplification of the stream.

The present invention is particularly concerned with but not limited to the coating of as many as from $10^5$ to $10^7$ channels in a single micro-channel glass plate where the channels might, for example, each be as small as from 10 to 15 microns in diameter and of lengths ranging from 25 to 100 or more times their diameter.

An object of the present invention is to provide improved channeled energy-conducting plates and, more particularly, to provide a novel, simple and inexpensive method for producing electrically conductive coatings on the walls of the channels in such plates.

Another object is to provide for a freedom of choice of both the base glass or equivalent dielectric material and the electrically conductive coating material used in the manufacture of electrically conductive channeled plates; and Still another object is to provide channeled energy-conducting plates which are adapted to serve as electron amplifiers in evacuated electron discharge devices with greater efficiency than has been known heretofore.

To obtain the aforesaid objects, and others which may appear from the following detailed description, in accordance with the principles of this invention, the channeled plates are internally coated by directing through the channels thereof an easily decomposed gaseous metal compound and heating it to its decomposition temperature within the channels to induce deposition of the metal along the channel walls in the form of an adherent electrically conductive film or coating.

A compound of carbon monoxide with a metal selected from one or more of the metal carbonyls may be used as the plating medium. Of the various metal carbonyls which are now commercially available, a highly suitable and desirable one of these is nickel carbonyl, $Ni(CO)_4$, having a boiling point or vaporization temperature of approximately 43° C and a decomposition temperature of approximately 85° C at one atmosphere. However, as it will become apparent hereinafter, various other metal carbonyls such as but not limited to molybdenum and tungsten carbonyls, can also be used according to the principles of this invention.

The selected carbonyl is heated to its vaporization temperature and caused to flow as a gas through the channels of the channeled plate intended to be internally metal coated. With the plate heated to the decomposition temperature of the particular carbonyl, the treatment is continued for a period of time sufficient to produce a wall coating within the channels of desired thickness.

The present invention will be more fully understood by reference to the following detailed description which is accompanied by a drawing in which FIG. 1 illustrates, in elevation, a channeled energy-conducting plate which is exemplary of the general type of structure intended to be treated according to principles of this invention;

FIG. 2 is a greatly enlarged cross-sectional view taken on line 2—2 of FIG. 1;

FIG. 3 illustrates, in cross section and generally schematically, an apparatus for carrying out the process of the invention; and FIG. 4 is a greatly enlarged fragmentary cross section of the plate schematically illustrating the result and purpose of forming electrically conductive coatings in the plate channels as contemplated herein.

Referring now to FIGS. 1 and 2, there is shown plate 10 comprising channeled section 12 fitted within annulus 14. Section 12 and annulus 14 are both formed of glass or an equivalent dielectric material. In the usual form of such devices, section 12 and annulus 14 are fused together with annulus 14 being adapted to serve as means for indirectly attaching section 12 to the walls or other receiving parts of a particular electron discharge device within which the channeled section 12 is to be used. Annulus 14 can and may actually be dispensed with in certain applications where it is possible to attach section 12 directly to a receiving part of an electron discharge device.

This invention is not limited in its application to any one type of structure in the general class of channeled plates and, accordingly, the drawing is intended to serve only in illustrating principles of the invention which, as it will become apparent hereinafter, relate to the provision of electrically conductive coatings on the interior walls of channels extending through multichannel plates regardless of their sizes and shapes. Details of various forms of devices with which plate 10 may be used following the hereindisclosed treatment thereof is immaterial to the present invention, and, accordingly, such apparatus and details thereof are not shown nor will they be discussed beyond the point required for a clear understanding of the purpose of this invention and the result attained thereby.

Section 12 of plate 10 is shown in the drawing as having relatively large channels 16. The size of the channels is so chosen only for clarity in illustration. Actually, in applications where such a plate is intended to be utilized as means for transferring an electron image, channels 16 would be of the order of less than a few thousandths of an inch in diameter and in some cases, as small as only a few microns in diameter. Channels 16 would also be as closely spaced in side-by-side relationship as possible without the channel walls becoming discontinuous. The size of channels 16 and spacing therebetween affect the degree of resolution attained by the transferred electron image. The more closely related and smaller such channels produce greater degrees of image resolution or definition of the transferred image. For some intended uses, channels 16 might be as small as only a few microns in diameter and spaced from each other a distance of one tenth of a channel diameter or less. Such plates will be referred to herein as micro-channel plates and although the present invention is particularly concerned with providing electrically conductive coatings in the channels of micro-channel plates, it is also applicable to channeled plates having much larger channels and/or plates having more widely individually spaced or differently arranged channels whether the channels are circular in cross section as illustrated or are of other cross-sectional configurations.

Micro-channel and larger channeled plates can be formed of glass tubules bundled together and fused without intervening spaces to provide the base glass 18 of the particular plate or they may be formed by other techniques involving the fabrication of a fused together bundle of glass clad fibers whose cores are selectively acid etched or otherwise subsequently removed thereby leaving substantially only the fiber cladding glass to form base glass 18. The manner in which particular channel plates are formed does not affect the practice of the present invention which is directed particularly to the coating of channels in channeled plates regardless of how the plates are formed. However, particulars of techniques which can be used to form section 12 of plate 10 are set forth in assignee's copending applications Ser. No. 281,884, filed May 21, 1963, now U.S. Pat. No. 3,275,428 and Ser. No. 307,401, filed Sept. 9, 1963, now U.S. Pat. No. 3,331,670, to which reference may be had for more detailed descriptions thereof.

Referring now to FIG. 3, it will be seen that walls 20 of channels 16 in plate 10 are metal coated according to one aspect of this invention by placing plate 10 at one end of a gas or vapor chamber 22 within housing 24. In the particular arrangement of apparatus which is shown for purposes of illustration only, housing 24 is formed of a pair of interconnected right-angularly related tubular sections 26 and 28. Lateral opening 30 in section 28 provides a clear passage from end 32 of section 26 through housing 24 to end 34 of section 28. Plate 10 is placed within end 34 of section 28 flat against fixed annular stop 36 and is held thereagainst by retainer 38. Retainer 38 is annular in form and is threaded onto end 34 of tubular section 28 to the point where plate 10 is forced into firm engagement with stop 36. Thus, a substantially gas tight seal is provided about the marginal portions or annulus 14 of plate 10 to prevent gas produced in chamber 22 from uselessly escaping around the outer edges of plate 10. The seal around annulus 14 need only be sufficient to provide a path of greater resistance to the flow of a gas therethrough than through any one of channels 16 in section 12 which channels are intended to receive and conduct the gas.

End 40 of section 28 is provided with closure 42 so that a gas directed into chamber 22 through end 32 of section 26 will flow toward plate 10 as indicated by arrows 43 and through channels 16 therein at a rate determined by the size of channels 16 and the extent of gas pressure developed in chamber 22.

As previously mentioned, a metal carbonyl is to be used as the plating medium which, when directed as a gas into channels 16 of plate 10 and caused to decompose therein, will form the desired adherent metal coating on walls 20 of the channels. While this invention is not restricted to the use of any particular metal carbonyl, nickel carbonyl, $Ni(CO)_4$, is a desirable exemplary plating medium. As already mentioned, $Ni(CO)_4$ is commercially available in liquid form, it has a relatively low boiling point of approximately 43° C and is thus easily converted to its gaseous state. Furthermore, it is decomposable at a relatively low temperature of approximately 85° C. This is considerably below the softening temperature of any glass or equivalent dielectric material which would ordinarily be used in the fabrication of channel plate 10. Thus, decomposition of $Ni(CO)_4$ in plate 10 can be effected at a temperature considerably below that which would tend to distort or otherwise adversely affect the base glass 18 of plate 10.

In housing 24 there is fitted vaporizer 44 within which the liquid metal carbonyl in converted to its gaseous state and directed into chamber 22. Vaporizer 44, being illustrated in its simplest form, comprises container 46 in which the selected liquid carbonyl 48 is placed and electrical heating coil 50 therebeneath for heating the carbonyl to its boiling point. Flame heating means may, of course, be substituted for coil 50. Container 46 is removable from housing 24 to facilitate placement of carbonyl 48 therein and is provided with neck 52 which fits tightly into tubular section 26 of housing 24 so as to form a substantially gas tight connection with section 26 when the vaporizer is in use. Thus, by continued and/or controlled more or less rapid boiling of the liquid carbonyl 48, the carbonyl gas thereby created can be brought to and held at a substantially constant predetermined pressure in chamber 22 to produce a desired rate of flow thereof through channels 16 in plate 10. The pore size of channels 16 will, of course, determine the amount of pressure required in chamber 22 to produce a particular desired flow rate. It is contemplated that the flow rate be at least sufficient to continually replenish the gas in channels 16 of plate 10 as it is decomposed therein so as to prevent a stagnation or build up of carbon monoxide in the channels following decomposition and release of the metallic component of the carbonyl gas. When the gas is decomposed or at least partially decomposed in channel 16 its metallic component is released and becomes deposited as an adherent coating on walls 20 of the channels. Thereafter the gas has no further utility in channels 16 as a plating medium and its remaining carbon monoxide component must be moved out of channels 16 and replaced by a fresh supply of gas to continue the plating action. This is achieved by inducing the aforementioned continuous flow of gas through channels 16.

The metal carbonyl gas can be decomposed along walls 20 of channels 16 of plate 10 simple by applying heat to end 34 of housing 24 which, by conduction, will raise the temperature of plate 10 to or slightly above the decomposition temperature of the particular carbonyl gas. An electrical heating coil 50 fitted circumferentially about retainer 38 is employed for this purpose and retainer 38 is, accordingly, preferably formed of a material selected to have a high degree of thermal conductivity. In so heating and holding plate 10 at or above the decomposition temperature of the carbonyl gas, there is a tendency for the metallic deposit or coating produced along channels 16 to become somewhat thicker adjacent the ends of channels 16 which are disposed inwardly of chamber 22. While this is functionally desirable for some applications, a more uniform thickness of coating can be obtained by directing the plating gas first through one and then through the opposite ends of channels 16. This is achieved by reversing plate 10 in end 34 of housing 24 during an intermediate stage of the plating cycle so as to effectively produce a reverse flow of the plating gas through channels 16.

The plating cycle in either the undirectional or reverse flow techniques mentioned above is continued for a period of time sufficient to produce a desired thickness of coating 52 (see FIG. 4) along walls 20 of channels 16 in plate 10. While coating 52 may be of considerable thickness, the illustration thereof is intended to represent an extremely thin or nearly monomolecular layer of metal produced by controlled timing of the plating cycle. As mentioned previously, a monomolecular coating, in the form of an interconnected latticing or network of molecules of the plating metal, will, to advantage, expose a substantial portion of the glass of walls 20 along the lengths of channels 16 while providing, at the same time, an electrically conductive path along these walls to which a potential gradient can be applied so as to adapt plate 10 for use as an electron conducting device. As such, it can be seen in FIG. 4 that plate 10 has utility as an electron amplifier. That is, with the corresponding opposite ends of coating 52 in plate 10 electrically connected in series with a source of electric current 54, electrons directed into the more negatively charged one ends of channels 16 will, upon being caused to cascade along walls 20 and coatings 52, free secondary electrons from said walls and coatings. The result of such secondary emission or multiplication will, accordingly, produce an electron gain or amplification at the exit, more positively charged, opposite ends of channels 16. The dash lines with arrow heads in FIG. 4 are intended to illustrate the above-mentioned effect of electron amplification wherein a single electron represented by arrow 56 might produce the result of an emission of a great number of electrons such as are exemplified by arrows 58.

In a channel plate having channels of approximately 25 microns in diameter and approximately 1 millimeter long each coated with a mono-molecular layer of nickel according to the principles set out above, an electron gain of the order of $10^4$ can be achieved with an operating potential of approximately 2,000 volts applied to the plate. At such operating potential a current of approximately $10^{-7}$ ampere per square centimeter will flow through the channels to continually replenish electrons lost by secondary emission without causing excessive heating.

In another aspect of this invention, the carbonyl plating gas is preheated in chamber 22 to a temperature only slightly below its decomposition temperature so that upon entering the channels 16 of heated plate 10 it will quickly reach its decomposition temperature and begin to decompose almost instantly along walls 20 of channel 16. Electrical heating coils 60 arranged to encircle sections 26 and 28 of housing 24 are provided for preheating the gas in chamber 22 and for maintaining the temperature of the gas substantially constant in section 28 at, for example, a temperature of from 2° to 10° below its decomposition temperature. Controls for maintaining heating coils 60 and/or coil 50 at desired operating temperatures are not illustrated herein since only well-known and conventional control means are intended to be employed.

In still another aspect of the present invention it is contemplated that plate 10 itself be normally maintained at approximately the above given preheated temperature of the gas and heated to or slightly above the decomposition temperature of the gas periodically while the gas is caused to continuously flow through channels 16. In this way, residues or excesses of carbon monoxide created in channels 16 following decomposition or partial decomposition of the carbonyl gas therein are forced out of the channels and replenished by fresh gas during intervals between periods of heating. Plate 10 is brought to a temperature near but below the decomposition temperature of the plating gas and held to the selected temperature with heating coil 50. When it is desired to raise the temperature of plate 10 to the decomposition temperature of the plating gas, plate 10 is irradiated with infrared radiation directed thereonto from a suitable high intensity source 62. A carbon arc or conventional infrared lamp may be used to produce the radiation at source 62. In order to irradiate plate 10 uniformly and thus avoid uneven heating thereof, collimating objective lens 64 is positioned between source 62 and plate 10 to receive and direct the infrared radiation from source 62 toward plate 10. In acting to collimate the radiation, lens 62 functions to distribute such radiation uniformly over the surface of plate 10 which is disposed theretoward. Lens 64 is, of course, formed of a material which is highly transmissive to infrared radiation. Suitable infrared transmitting materials are arsenic trisulfide glass and fused quartz. Infrared radiation cast upon plate 10 from source 62 will increase the temperature of the plate to the decomposition temperature of the plating gas being directed through its channels 16 and, accordingly, incite the above-described plating action to product coatings 52. Repeated intermittent exposure of plate 10 to radiation from source 62 is continued until a desired thickness of coatings 52 is achieved.

Radiation at source 62 may be produced with explosive filament photographic flash bulbs or, if it is produced by a conventional infrared lamp or carbon arc as already mentioned, the lamp or arc may be operated intermittently to subject plate 10 to timed exposures of the infrared radiation. A single prolonged exposure may be desirable in some cases.

While the foregoing has dealt primarily with the forming of coatings in channel plates under conditions of normal atmospheric pressure, it should be understood that the process may be performed at other than one atmosphere of pressure. That is to say, any one or all of the above-described operations may be carried out within either a pressurized or an evacuated enclosure or chamber, not shown.

Those skilled in the art will readily appreciate that various modifications and adaptions of the procedures and form of apparatus shown and described herein may be made to suit particular requirements. Accordingly, it is intended that all modifications which are based on the novel teachings provided herein are to be construed as coming within the scope of the appending claims or the range of equivalency to which they are entitled in view of the prior art.

I claim:

1. In a method of gas plating the walls of channels of a multi-channeled electron amplifying element by thermal decomposition of a metal plating vapor continually directed through said channels, the improvement comprising the steps of:

preheating said plating vapor to nearly its decomposition temperature prior to entrance thereof into said channels of said element; and intermittently heating said element to a temperature at least equal to that of the decomposition temperature of said plating vapor and allowing said element to cool to a temperature below said decomposition temperature during intervals between said intermittent heating to effect flushing of residue gases of said vapor in said channels by said continuous flow thereof during said intervals.

2. The method as recited in claim 1 wherein said heating of said element is effected by intermittent irradiation thereof.

* * * * *